United States Patent [19]
Densmore

[11] Patent Number: 4,474,289
[45] Date of Patent: Oct. 2, 1984

[54] CONTROL MEMBER FOR AN ELONGATABLE CONVEYOR BELT

[75] Inventor: Neal W. Densmore, Franklin, Pa.

[73] Assignee: Joy Manufacturing Company, Pittsburgh, Pa.

[21] Appl. No.: 374,845

[22] Filed: May 5, 1982

[51] Int. Cl.³ .............................................. B65G 15/08
[52] U.S. Cl. .................................... 198/818; 198/844
[58] Field of Search ............... 198/818, 820, 821, 823, 198/824, 825, 827, 828, 829, 830, 831, 844, 847

[56] References Cited

U.S. PATENT DOCUMENTS 821,121  5/1906  Plummer .......................... 198/818 X
4,387,801  6/1983  Hoover .............................. 198/821

Primary Examiner—Robert J. Spar
Assistant Examiner—Jonathan D. Holmes
Attorney, Agent, or Firm—Raymond W. Augustin

[57] ABSTRACT

This invention is to a formed control member which is secured to a longitudinally stretchable or elongatable conveyor belt to provide a generally uniform longitudinal elongation throughout the length of the belt and to indicate a preselected total elongation of the belt. The form of the control member also provides a visual indication of the approximate elongation of the belt.

10 Claims, 6 Drawing Figures

CONTROL MEMBER FOR AN ELONGATABLE CONVEYOR BELT

CROSS REFERENCES TO RELATED APPLICATIONS

Each of the following patents or applications are illustrative of the state of the art to which the invention of this application is drawn,
1. U.S. Pat. No. 4,387,801 issued June 14, 1983.
2. U.S. Pat. No. 4,339,031 issued July 13, 1982.
3. Ser. No. 333,597 filed Dec. 23, 1981.
4. U.S. Pat. No. 4,433,777 issued Feb. 28, 1984.
5. Ser. No. 346,683 filed on Feb. 8, 1982.

BACKGROUND OF THE INVENTION

As is known, conveyor belts have recently been developed for traveling through an orbit with a generally horizontally extending conveying run overlying a generally horizontally extending return run with the conveying and return run being stretched or elongated to provide a tension in the sides of the conveying run remain in tension as the conveying run traverses a horizontal curve. By retaining the sides of the conveying run in tension as the conveying run traverses a horizontal curve the material being transported is maintained on the conveying run rather than permitting excess spillage as occurs with prior, non-special forms of conveyor belts. The original description of such a tensioned conveyor belt is set forth in U.S. patent application Ser. No. 06/069,664, now abandoned, and U.S. Pat. No. 4,387,801, wherein one embodiment of a conveyor belt is disclosed and described having a selected limited elongation for establishing the overall length of an orbital conveyor belt. Such conveyor belt elongation is obtained by fastening an orbital drive chain to the resilient conveyor belt with the belt in its relaxed or slack condition, i.e., without any longitudinal tension being applied to the belt runs, with a specific spatial relationship between adjacent links of the chain. When such chain is longitudinally tensioned, as is the case when supported for travel through an orbital path as shown in U.S. Pat. No. 4,339,031, the slack between adjacent links of the chain is eliminated or taken up and the chain becomes taut. The slack eliminating tensioning of the chain also simultaneously elongates the conveyor belt to the same linear extent as the chain is elongated when moving from a slack to taut position. Thus, a preselected elongation is achieved in the conveyor belt as determined by the total slack between adjacent links of the chain. A similar functioning slack-taut chain is also disclosed in the patent application Ser. Nos. 116,722, now abandoned, and 346,683, the continuation application thereof; however, the chain of such applications comprises links which are identical in form. As can be readily appreciated, the providing of formed chain links to drive a conveyor belt represents a considerable expense and the operation of a metallic chain over metallic drive and/or idler sprockets creates a level of noise which may be objectionable. Preferably drive chain noise is maintained at an acceptable level.

Other prior conveyor belts have been designed to traverse horizontal curves such as a special form of conveyor belt as shown in U.S. Pat. Nos. 3,545,598 and 3,701,411. Such belts incorporate molded edge flutes which fold and unfold as required in traversing a horizontal turn. Such molded flute structure is expensive and subject to possible excessive wear due to the accumulation of particles of the material being conveyed in the flutes which may abrade the flutes as they fold and unfold. Another prior conveyor belt structure, shown in U.S. Pat. No. 4,061,223, requires a separate belt driving element, disclosed as a drive or power belt, which contacts the conveying belt to drive the conveying belt. As the power belt stretches an indeterminate amount, it is not possible to apply a driving force to the power belt without stretching the power belt. Such stretching of the power belt varies and is uncontrollable so that the power belt cannot be driven by conventional belt drives or installed on conventional conveyor belt supports.

SUMMARY OF THE INVENTION

The present invention is to a control member for providing a generally uniform longitudinal tension in a stretchable or elongatable conveyor belt and for indicating when a desired elongation of the conveyor belt has been achieved. At the outset it is to be noted that an elongatable conveyor belt with which a control member of this invention is to be used refers to a conveyor belt of a construction such that the conveyor belt will maintain tension in each of its sides as the belt traverses a horizontal curve. As of this time the percentage of elongation that is desired in a conveyor belt to maintain tension in the sides of the belt under various operating conditions has not been determined; however, the amount of elongation as is desired in one type of installation is described herein to illustrate a typical elongatable belt with which the control member of this invention is used. Thus, in transporting coal via a 400 foot conveyor train which train traverses horizontal curves having a 30 foot radius to the horizontal centerline of the belt, an 8% or slightly greater initial elongation of the conveyor belt has been found to be desirable. With such 8% or 8+% belt elongation the belt tension in the inner, smaller radius of the belt is relaxed as the inner edge of the belt traverses the 30 foot curve and the inner edge of the belt is foreshortened. It is estimated that the initial 8% elongation of the inner edge is reduced to about 2% as the inner edge of the belt traverses the 30 foot curve. Such 2% elongation of the belt provides sufficient tension in the inner edge to prevent excess spillage of coal over the inner edge of the conveying run. Conversely, the belt tension in the outer belt edge increases as the belt traverses the 30 foot curve since the outer belt edge must elongate to traverse the curve. It is estimated that the initial 8% elongation of the outer edge increases to 14% as the outer edge traverses a 30 foot curve. Since, in a 400 foot conveyor the horizontal curves may be in opposite directions, an inner belt edge traversing one curve may be an outer belt edge as the belt traverses a subsequent curve. Consequently each side of the conveyor belt must be capable of being elongated by 14%. A 16% elongation is estimated to occur under extreme operating conditions. The 2% and 16% belt elongations are merely best estimates for the conveying system described as to date it has not been necessary to determine the actual percentage of belt elongation in the inner and outer edges of a belt traversing a 30 foot curve since an initial 8% elongation has provided a satisfactory conveyor belt regardless of the actual percentage elongation of the sides. Also, conveyor systems with different curve radius may be used in which event the 2% and 16% belt elongation can vary. Thus, as previously stated, the percentage of initial belt elongation is selected with reference to the tension required to retain each side of the belt in sufficient tension as it traverses a horizontal curve of the conveying system and maintain its material conveying capability.

It is also to be noted that prior belt conveyors were of a designed structure whereby belt elongation was a minimum as belt elongation is not desired in non-curvilinear path conveyors as the advantages of belt elongation for a curved conveyor were not understood prior to the invention of Ser. No. 06/069,664, now abandoned. Prior belt conveyors for the coal industry, generally comprised a rubber or rubber-like compound for the body with various fabric and wire constructions being embedded in the body to provide the necessary strength to the belt. Such prior conveyor belts were physically elongated; however, their elongation was insufficient to provide a belt having constantly tensioned sides as the belt traversed a 30 foot horizontal curve.

Specifically the control member of this invention comprises an enlongated endless multi-sectioned formed strap consisting of bowed portions located between anchored or fixed portions which fixed portions are secured to the underside of a series of joined sections of an orbital elongatable conveyor belt. The bowed portions of the strap form a series of bowed portions throughout the length of the conveyor belt such that, upon proper tensioning, stretching or elongation of the belt and strap assembly for orbital movement, the longitudinal movement of the strap causes each of the bowed portions to flatten and extend longitudinally between adjacent fixed portions with the maximum orbit length of the conveyor belt being determined by the length of the so flattened strap. The combination of such a strap with an elongatable conveyor belt provides a unique form of conveyor belt assembly having a controlled maximum elongation or stretch. Further the securing of the anchored or fixed portions of such strap throughout the entire length of the conveyor belt maintains a generally uniform longitudinal tension in the belt throughout the length of the belt.

Accordingly, one object of this invention is to provide an elongatable conveyor belt having a strap secured thereto for obtaining a desired longitudinal length of the belt upon elongation of the length of the conveyor belt.

Another object of this invention is to provide an elongatable conveyor belt having a strap secured thereto which strap has a series of alternating anchored and extensible portions for maintaining a generally uniform longitudinal tension in the conveyor belt upon elongation of the conveyor belt.

A further object of this invention is to provide an elongatable conveyor belt having a strap secured thereto which strap has a series of extensible portions for generally visually indicating the elongation of the conveyor belt.

Another object of this invention is to provide an endless formed strap for attachment to an elongatable conveyor belt supported for orbital movement which strap indicates the desired elongation of the conveyor belt when the strap is moved simultaneously with the conveyor belt during the elongation of the conveyor belt.

A still further object of this invention is to provide an endless formed strap for generally visually indicating the percentage of elongation of an elongatable conveyor belt upon elongation of the conveyor belt.

A more specific object of this invention is to provide an endless formed strap for establishing the desired elongation of an elongatable conveyor belt with the strap consisting of a series of alternating anchored and extensible portions.

Another object of this invention is to provide an endless formed strap for maintaining a generally uniform longitudinal tension in an elongatable conveyor belt upon elongation of the conveyor belt.

These and other objects of this invention will be better understood in view of the following description and illustrative drawings of a presently preferred embodiment of this invention in which.

Figure 3:
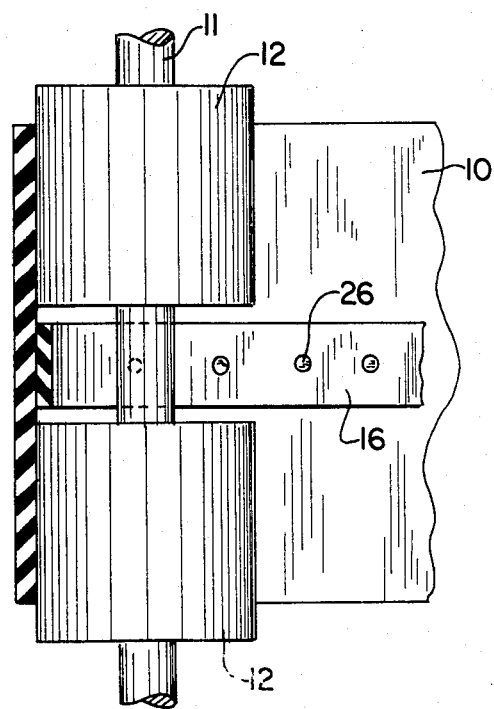
FIG. 3 is a top plan view of an end roller portion of the conveyor belt as shown in FIG. 1 with the upper conveyor run of the belt omitted.

As is known, conveyor belts are formed from natural rubber, or various rubber compounds such as neoprene which compounds are normally proprietary to the various belt manufacturers. Conveyor belts, such as those previously used in conveying coal and the elongatable belts with which the control means of this invention is used, commonly comprise a plurality of elongated belt sections 2, FIG. 5, joined at each end to an end of an adjacent elongated section 2 by means of a suitable belt joint or connector 4 to form an elongated orbital conveyor belt 6. Orbital belt 6 provides an upper conveying run 8 which overlies a return run 10 with the end portions of the orbital belt 6 traveling over belt reversing end rollers 12. Belt 6 is suitably frictionally driven by suitable drive means (not shown) connected to central shafts 11, FIG. 3, of the end rollers 12. Suitable formed supports (not shown) are spaced longitudinally intermediate end rollers 12 to support the return run 10 in an essentially flat condition and to support the conveying run 8 in a troughed condition to permit coal to be conveyed within such trough. Suitable means (not shown) are provided to position end rollers 12 longitudinally with respect to each other to provide the proper longitudinal tension within the conveying and return runs 8 and 10. Inasmuch as the structures heretofore identified are known in the art (see the prior patent applications incorporated herein) and are not a part of this invention, further description thereof is not necessary for the understanding of this invention with respect to one reasonably skilled in the relevant art.

Each relaxed belt section 2 in the top plan view is essentially of an elongated rectangular form having a plurality of holes 14 extending transversely therethrough and spaced along the central longitudinal axis x—x thereof with the central axes of the holes 14 being coincident with the central axis x—x. Holes 14 in the relaxed belt are spaced a selected longitudinal distance S from each other so that each pair of adjacent holes 14 is spaced essentially the same longitudinal distance S from each other. The holes 14 adjacent the ends of longitudinally abutting belt sections 2 are spaced inwardly of an outer edge of a section 2 a distance slightly less than one-half the distance S so that the longitudinal distance between adjacent holes 14 of abutting sections 2 plus the longitudinal extent of a connector 4 therebetween is essentially the same as distance S. Accordingly, all centers of all holes 14 are longitudinally spaced essentially the same distance S notwithstanding that some holes 14 are separated by a connector 4. A sufficient number of belt sections 2 are secured in longitudinally abutting relationship by means of connectors 4 to provide the necessary length of conveyor belt for a conveying system such as that shown in the patent applications incorporated herein. For example, a conveyor system of such prior art has a nominal length of 400 feet and ten belt sections 2 each of a 74 foot length secured together to provide a 740 foot length of conveyor belt in the relaxed condition. The 740 feet of relaxed conveyor belt is then stretched or longitudinally elongated an additional 60 feet to provide the necessary 800 feet of conveyor belt 6 for a nominal 400 foot conveyor system.

The presently preferred structure for the control means of this invention comprises, as shown, a strap 16 which is secured to the undersurface of the joined or connected belt sections 2 in their relaxed condition. In a 740 foot length of connected belt sections 2 it is impractical to provide a one piece strap 16 having a 740 foot length. Accordingly, strap 16 consists of a series of elongated strap sections 18 with each end portion 17 of each section 18 being secured to the end portion 17 of the adjoining section 18 to form a unitary strap 16 which is coextensive with the connected belt sections 2. Although strap sections 18 may be of any suitable length, a length greater than 74 feet is provided with a 74 foot length belt section 2 so that each section 18 extends throughout the length of a belt section 2 and has a sufficient end portion 17 length at each of its ends to form an overlying or lap joint with the longitudinally adjacent strap sections 18. Each strap section 18 comprises an elongated formed member having a series of uniformly longitudinally spaced anchor or fixed portions 20 connected together by integral extensible portions 22.

Anchor portions 20 are essentially identical in form and extend in longitudinally abutting relationship with the undersurface of belt sections 2. Each anchor portion 20 has a longitudinally centrally located hole 24 extending transversely therethrough. Holes 24 have their central axis coincident with the central axes of holes 14 to the extent practiced in fabrication. Holes 14 and 24 are of circular cross section with holes 24 having a smaller diameter than holes 14. Each anchor portion 20 is secured to an abutting belt section 2 in a relaxed condition by suitable fastening means such as a formed elongated fastener 26 extending through aligned openings 24 and 14. The particular fastener 26 shown is a Townsend fastener in its form after installation. Inasmuch as Townsend fasteners are well known and do not constitute a part of this invention, further description thereof and their installation is not believed necessary to one reasonably skilled in the relevant art. When installed the fasteners 26 are closely received within the openings 24 and 14 with an enlarged head portion 28 embedded in the material receiving surface of a section 2 and a nut element 29 on the reverse side of the section 20 for properly retaining the fastener 26 as shown. The body portion 30 of fastener 26 located within the belt sections 2 is larger than the body portion 32 of fastener 26 located in the strap sections 18 to provide a larger bearing surface for the belt section 2.

Each extensible portion 22 bows outwardly from the undersurface of the adjacent belt sections 2. In forming a strap section 18 the longitudinal distance between the centers of adjacent holes 24 is greater than the longitudinal distance between the centers of adjacent holes 14 so that in anchoring anchor portions 20 as described the extensible portions 22 are deformed into an outwardly bowed form with respect to the undersurface of the sections 2. Holes 24 in the overlapping end portions 17 are secured to each other and to belt section 2 by means of a fastener 26' which is the same as fastener 26 previously described, but which fastener 26' has a longer body portion 32' to accommodate the double thickness of the overlying end portions 17. Thus, when the entire conveyor belt is assembled in a relaxed condition the strap sections 18 are coextensive with the connected belt sections 2 and have a series of bowed extensible portions 22 extending along and outwardly of the underside of the connected belt sections 2 except for the portions of the belt sections 2 at the connectors 4.

Figure 4:
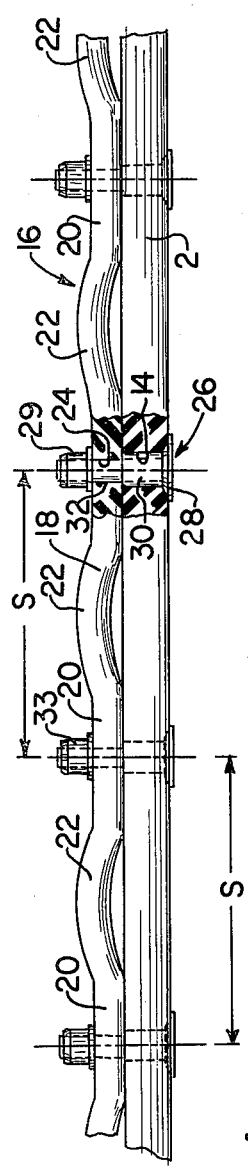
FIG. 4 is a side elevational view of a portion of a conveyor belt constructed in accordance with the principles of this invention in a relaxed or unstretched mode.
Figure 5:
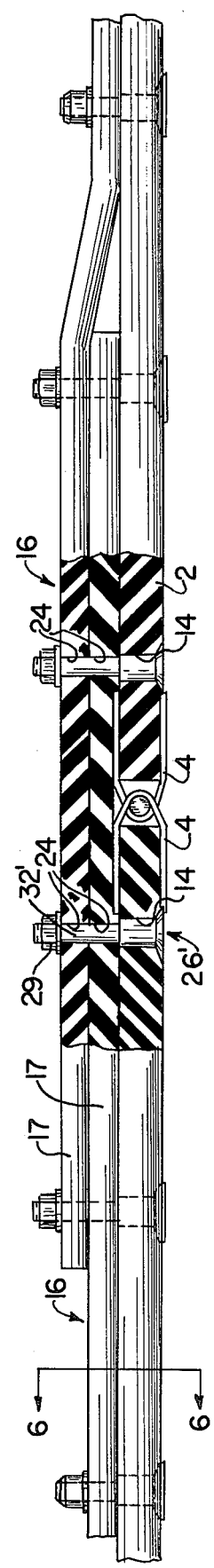
FIG. 5 is a side elevational view, partially in section, of an end juncture portion of the elongated conveyor belt as shown in FIG. 2.
Figure 6:
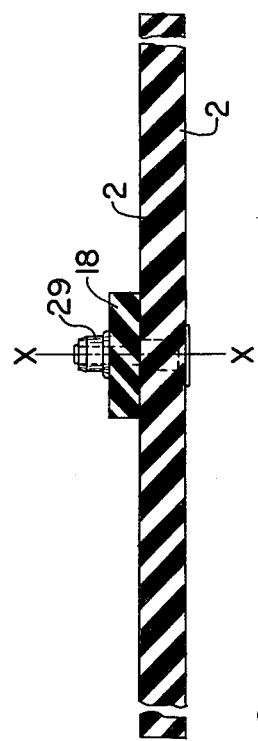
FIG. 6 is a cross sectional view of the conveyor belt as shown in FIG. 5 taken along line 6—6 thereof.

In one method of forming the orbital belt 6 the free ends of the connected relaxed belt sections 2 are spaced approximately 60 feet apart in the path of the conveying run 8 with a pair of spaced free end portions 17 also being spaced essentially 60 feet apart. With one free end of the relaxed belt sections 2 being fixed the other free end of the relaxed belt sections 2 is pulled towards the fixed free end until the ends of the connected belt sections 2 overlap each other to permit the end portions 17 to be connected by fasteners 26', FIG. 5, and the ends of the belt sections 2 to be connected by a connector 4 in a well known manner. As shown in FIG. 5 each unconnected end portion 17 of the strap 16 has four longitudinally spaced holes 24 therein having centers longitudinally spaced a distance somewhat greater than the distance S when the belt sections 2 are in their stretched condition. Thus, in a nominal 400 foot conveyor, S may equal $4\frac{5}{8}$ inches in a relaxed belt while the holes 24 of the strap 16 in a stretched condition are spaced on 5 inch centers, i.e., S will increase from the $4\frac{5}{8}$ inches in a relaxed belt to 5 inches in a stretched belt. As the connected belt sections 2 and strap 16 are pulled the belt sections 2 will elongate (i.e., the belt sections 2 are stretched or longitudinally tensioned) while the extensible portions 22 will initially be longitudinally extended so that the initial compressive load imposed thereon during assembly will be released as the portions 22 straighten out. Continued straightening of the strap 16 along with the pulling of the connected belt sections 2, will cause the belt sections 2 to be further elongated and portions 22 to straighten out into a position in engagement with the undersurface of the belt sections 2. As the free ends 17 of the strap 16 are moved longitudinally into overlapping relationship with the concurrent elongation of the belt sections 2, fasteners 26' are inserted into the aligned holes 14 and 24, FIG. 4, with the ends 17 of the strap being secured to each other and the adjacent belt sections 2. Fastener 26', as before described, is of a length to accommodate a double thickness of strap 16.

As is known, pulling the free end of belt sections 2 towards the fixed end for a distance of 60 feet in the conveying run 8 without the strap 16 of this invention, all of the belt sections 2 do not normally elongate uniformly. In practice such pulling of the free end of the belt sections 2 causes the belt sections 2 extending between the free end and the end pulley 12 to first elongate until a sufficient force is obtained in the belt sections 2 to cause the belt sections 2 to move around the end pulley. Consequently the pulling of the belt sections 2 tends to be a series of build ups of longitudinal tension in the belt sections 2 with spaced periods of sliding movement about the end pulley 12. Thus, elongation of belt sections 2 without a strap 16 attached is in the nature of waves of elongation of the belt sections 2 with periods of partial relaxation of tension occurring as the belt sections move about the end pulley 2. For the purposes of this invention strap 16 is formed from a material having a minimal elongation upon pulling so that as the connected belt sections 2 and strap 16 are pulled the pulling force is transmitted through the strap 16 to simultaneously tension all of the belt sections 2 by the engagement of the fasteners 26 with both the strap 16 and the belt sections 2 throughout the length of each belt section 2. A particularly satisfactory material for the strap 16 is a strip of conveyor belting as used previously in coal conveying which has a minimum longitudinal elongation capability. In particular prior conveyor belting with longitudinally extending steel wire reinforcing members has a minimum longitudinal elongation capability.

By proper selecting of the bow of the extensible portions 22, the total extension length of the strap 16 is essentially equal to a preselected or desired increase in length of the belt sections 2 to provide a preselected or desired longitudinal tension in the orbit belt 6. Since portions 22 are free to move from their bowed to their flat position, the strap 16 is essentially unstressed when secured together while the orbit belt 6 is elongated to provide the required prestretch or longitudinal tensioning.

It will be noted that the prestretch given to the orbital belt 6 is determined by the increase in length of the strap 16 as the bowed portions 22 straighten out; that is, move from their bowed to their straight condition. Consequently, the total elongation due to straightening of the bowed portions 22 is selected with reference to the amount of stretching of belt sections 2 as is desired to obtain a desired stretch or tension in the orbital belt 6. The stretching of belt sections 2 can be controlled by varying the distance S between adjacent holes 24 in the strap 16 and/or the length of bow in the bowed portions 22.

Thus, when viewing the amount of bow in portions 22 one can obtain a visual indication as to the amount of elongation in the belt sections 2. In particular with the connected belt sections 2 being elongated to almost their full extent the portions 22 will have a very slight bow so that the final elongation of the belt sections 2 can be gradually obtained. Upon proper elongation of the belt sections 2 sufficient tension is provided in strap 16 to maintain strap 16 taut.

Once the orbital belt 6 has the proper orbital length the extended strap 16 provides a means for limiting further elongation of the orbital belt 6. Thus, once the orbital belt 6 is formed any attempt to additionally elongate the belt 6 by further moving the end rollers relatively apart will tension strap 16 beyond the tension therein to maintain strap 16 taut. Such additional tensioning of strap 16 does not provide any substantial further elongation of the orbital belt 6 due to the lower elongation capability of the strap 16. Such limiting of the orbital length of orbital belt 6 is, of course, limited by the yield point of the material of strap 16; however, with strap 16 being formed from prior conveyor belt material the elongation capability of strap 16 is estimated to be no more than 1 to 2 percent.

Figure 1:
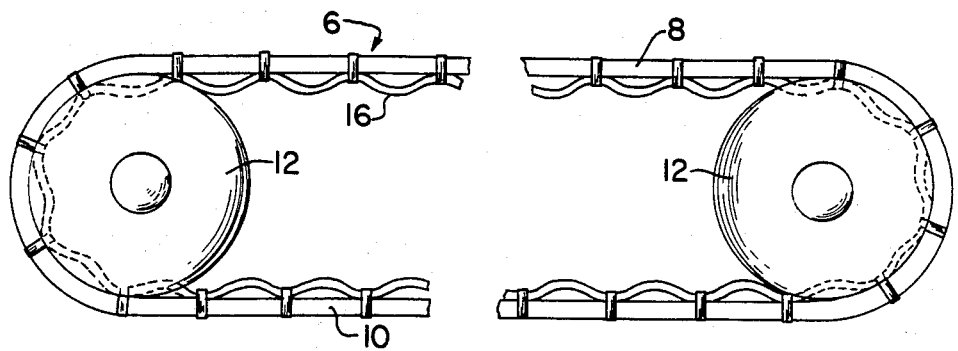
FIG. 1 is a schematic representation of an endless elongatable conveyor belt built in accordance with the principles of this invention when supported for orbital movement with the conveying run overlying the return run and with the end rollers supporting the runs in their relaxed or unstretched mode.
Figure 2:
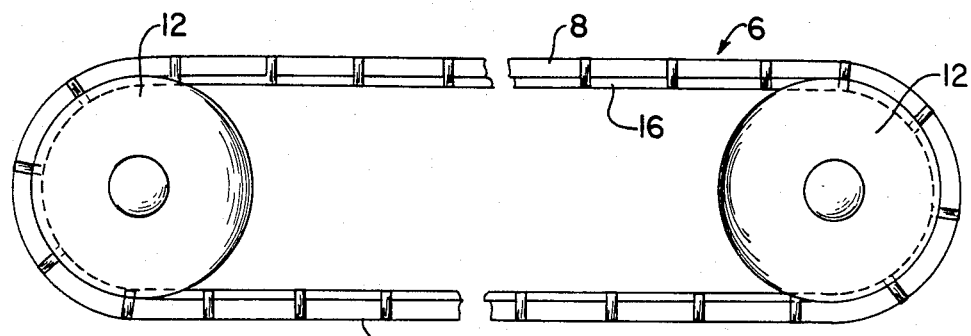
FIG. 2 is a schematic representation of the conveyor belt as shown in FIG. 1 with the end rollers supporting the runs in their elongated mode.

Although as described above, the orbital belt 6 is formed by pulling a free end of the belt sections 2, the orbital belt 6 can also be formed in a closed loop as shown in FIG. 1 in a relaxed mode and thereafter stretched into an elongated mode as shown in FIG. 2. Regardless of the method of forming the stretched orbital belt 6 the action and function of the anchor portions 20 and extensible portions 22 is the same since the difference resides in when the connection between the free ends of the belt sections 2 is made, i.e., before or after the stretching of the belt sections 2.

The extensible portions 22 can be formed with any suitable configuration with one practical alternate form being that of a lazy S, i.e., an S configuration laying on a side. Such lazy S form will provide the strap limiting feature as described above; however, the visual indication of belt elongation is not as pronounced as in the bowed form shown and described.

Having described a preferred embodiment of this invention in accordance with the Patent Statutes and having set forth various modifications thereto, those skilled in the art will be cognizant of the fact that still other modifications can be made without departing from the spirit and scope of this invention. Accordingly, the following claims are to be construed as including modifications of the structures defined therein as would be known to those skilled in the relevant art.

I claim:

1. A conveyor belt assembly comprising:
an elongated conveyor belt of a structure to permit repeated longitudinal elongation of a troughed conveying run thereof to an extent that tension is maintained in each side of the troughed conveying run as the conveying run traverses a horizontal curve,
an elongated member longitudinally coextensive with said conveyor belt, said elongated member consisting of alternating first and second portions, said first portions being secured in fixed relationship with respect to said conveyor belt, each of said second portions being of a one piece, flexible form to be freely deformable with respect to said conveyor belt both before and throughout the longitudinal elongation of said conveyor belt by a predetermined amount from a relaxed condition and throughout the longitudinal contraction of said conveyor belt from said predetermined elongation to a relaxed condition, each of said second portions being of a form to extend longitudinally between the adjacent ones of said first portions as said conveyor belt is elongated by said predetermined amount in a substantially longitudinally unstressed condition, and each of said second portions in a substantially elastically longitudinally stressed condition parallel to the longitudinal extent of said conveyor belt upon the longitudinal elongation of said conveyor belt slightly beyond said predetermined amount in order to form said conveyor belt into said elongated, troughed condition.

2. A conveyor belt assembly as set forth in claim 1 wherein said second portions are of a form to bow outwardly from said conveyor belt when said conveyor belt is in a relaxed condition.

3. A conveyor belt assembly as set forth in claim 2 wherein said second portions extend in a straight path with respect to said first portions when said conveyor belt is elongated by said predetermined amount.

4. A conveyor belt assembly as set forth in claim 3 wherein the degree of bow of each of said second members is essentially uniform throughout the elongation of said conveyor belt by said predetermined amount.

5. A conveyor belt assembly as set forth in claim 1 wherein said elongated member is of a structure to have substantially less capability of elongation without causing permanent deformation thereof than said conveyor belt.

6. A conveyor belt assembly as set forth in claim 5 wherein said conveyor belt has an elongatability at least ten times greater than the elongatability of said elongated member without causing permanent deformation thereof.

7. A conveyor belt assembly comprising:
an elongated conveyor belt of a structure to permit repeated longitudinal elongation thereof of at least 4% and in excess of 8% from a relaxed condition, and
an elongated member longitudinally coextensive with said conveyor belt, said elongated member consisting of alternating first and second portions, said first portions being secured in fixed relationship with respect to said conveyor belt, each of said second portions being of a one piece, flexible form to be freely deformable with respect to said conveyor belt both before and throughout the longitudinal elongation of said conveyor belt by a predetermined amount from a relaxed condition and throughout the longitudinal contraction of said conveyor belt from said predetermined elongation to a relaxed condition, each of said second portions being of a form to extend longitudinally between the adjacent ones of said first portions as said conveyor belt is elongated by said predetermined amount in a substantially longitudinally unstressed condition, and each of said second portions in a substantially elastically longitudinally stressed condition parallel to the longitudinal extent of said conveyor belt upon the longitudinal elongation of said conveyor belt slightly beyond said predetermined amount, in order to form said conveyor belt into an elongated, troughed condition.

8. An elongated control member for an elongatable conveyor belt comprising alternating first and second portions, said second portion being freely deformable both before and during a predetermined elongation, each of said first portions being adapted to be secured in fixed relationship to an elongatable conveyor belt, each of said second portions being of a one piece, flexible form to extend longitudinally between adjacent ones of said first portions in a substantially unstressed condition and each of said second portions in a substantially elastically longitudinally stressed condition parallel to the longitudinal extent of said conveyor belt as said conveyor belt is elongated slightly beyond the predetermined amount in order to form said conveyor belt into an elongated, troughed condition.

9. An elongated control member as set forth in claim 8 wherein said control member has a capability of elongation without causing permanent deformation or breaking thereof which is substantially less than the capability of such a conveyor belt to elongate without causing permanent deformation thereof.

10. An elongated control member as set forth in claim 8 wherein said control member is formed from a rubber or rubber like compound having means therein to prevent any substantial elongation thereof without causing a permanent deformation thereof.

* * * * *